(12) United States Patent
Doan Huu (10) Patent No.: US 11,823,073 B2
(45) Date of Patent: Nov. 21, 2023

(54) DECLARATIVE DEBRIEFING FOR PREDICTIVE PIPELINE

(71) Applicant: SAP SE, Walldorf (DE)

(72) Inventor: Jacques Doan Huu, Guyancourt (FR)

(73) Assignee: SAP SE, Walldorf (DE)

( * ) Notice: Subject to any disclaimer, the term of this patent is extended or adjusted under 35 U.S.C. 154(b) by 1109 days.

(21) Appl. No.: 16/190,518

(22) Filed: Nov. 14, 2018

(65) Prior Publication Data

US 2020/0151588 A1     May 14, 2020

(51) Int. Cl.
    *G06N 5/04*      (2023.01)
    *G06N 20/00*      (2019.01)

(52) U.S. Cl.
    CPC ............. *G06N 5/04* (2013.01); *G06N 20/00* (2019.01)

(58) Field of Classification Search
None
See application file for complete search history.

(56) References Cited

U.S. PATENT DOCUMENTS

2018/0052898 A1*   2/2018   Allan .................. G06F 16/2322

OTHER PUBLICATIONS

Gil, et al., P4ML: A Phased Performance-Based Pipeline Planner for Automated Machine Learning, ICML 2018 AutoMLWorkshop, Proceedings of Machine Learning Research, 2018, pp. 1-8 (Year: 2018).*

Stefanowski, Data Mining—Evaluation of Classifiers, SE Master Course, Lecture 4, Poznan University of Technology, Institute of Computing Sciences, 2010, pp. 1-36 (Year: 2010).*

* cited by examiner

*Primary Examiner* — Wilbert L Starks
(74) *Attorney, Agent, or Firm* — Buckley, Maschoff & Talwalkar LLC (57) ABSTRACT

Provided are systems and methods for auto-completing debriefing processing for a machine learning model pipeline based on a type of predictive algorithm. In one example, the method may include one or more of building a machine learning model pipeline via a user interface, detecting, via the user interface, a selection associated with a predictive algorithm included within the machine learning model pipeline, in response to the selection, identifying debriefing components for the predictive algorithm based on a type of the predictive algorithm from among a plurality of types of predictive algorithms, and automatically incorporating processing for the debriefing components within the machine learning model pipeline such that values of the debriefing components are generated during training of the predictive algorithm within the machine learning model pipeline.

19 Claims, 9 Drawing Sheets

Record Count 251

Total = 48842
Training = 39074
Validation = 9768

Training Statistics 252

Selected Variables = 14
Total Variables = 15

Target Statistics 253

Target Category 0  76.04%

1  23.96%

Variable Contributions 254

Variable A  23%

Variable B  20%

Variable C  18%

Variable D  7%

Key Performance Indicators 255

AUC:
0.91

Classification Rate:
0.85

KS:
0.64

Predictive Confidence:
0.99

Predictive Power:
0.81

Sensetivity:
0.68

Specificity:
0.9

DECLARATIVE DEBRIEFING FOR PREDICTIVE PIPELINE

BACKGROUND

Predictive analytics can guide organizations in making informed decisions. Predictive analytics rely on predictive models that are "learned" based on large volumes of historical data. The learning is a gradual process that involves providing a machine learning algorithm with training data from which to learn a model. The training data typically contains sets of input data and a correct answer (or, target) corresponding to each set of input data. The machine learning algorithm finds patterns in the training data that map the sets of input data to the corresponding targets, and outputs a model that captures these patterns.

To assess the performance of the machine learning model during training, debriefing information may be extracted from the training process. The debriefing information can provide metrics or other indicators which indicate the accuracy of a predictive function of the machine learning algorithm, provide insight into the importance of specific variables with respect to the target, output graphs and charts, and the like. However, there are many types of machine learning algorithms and many types of debriefing information which can be used to evaluate a machine learning algorithm. Typically, a business user has to choose (guess and check) the types of debrief information to be used during training of the model, and specify appropriate processing operations for generating the debriefing information when building a complex data flow pipeline for the model. Such manual requirement to add debrief processing is difficult, error prone, and exhaustive, especially for a non data-scientist.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

A predictive model may be trained (e.g., through machine learning) using historical data and may be used to provide a prediction based on new/live data. Predictive models can be applied to various domains such as supply chain, weather, machine/equipment assets, maintenance, law enforcement, and the like. The predictive model may be trained based on patterns, trends, anomalies, and the like, identified within historical data. Predictive models have various types, for example, classification models, regression models, time-series models, clustering models, and the like. When creating a predictive model, a user may specify an input dataset, a target variable, and maybe other variables for the predictive model to explore. These settings are used to train the predictive model. Training is a process that uses a machine learning algorithm (i.e., a predictive algorithm) to explore relationships in the input dataset and find the best combinations for making predictions. The result is a formula (i.e., a machine learning model) that can be applied to a new dataset to obtain predictions.

The input dataset is a model's training dataset. As the values of the target variable are known, the data can be used to evaluate the accuracy of the predictive model's results. During the training process, the dataset may be cut into sub-sets using a partition strategy, with a final partition used to validate the predictive model's performance, using a range of statistical and graphical tools. Typically, the training progress is monitored via a status panel or other user interface component. Through the interface, a user can receive information concerning warnings and errors generated during the training process. If the training is successful, the predictive model may produce debriefing information that can include a range of statistical KPIs, variable contributions, graphical charts, and the like, which provide a user with insight into the training results. Assessing the accuracy and robustness of the training of the predictive model is referred to as debriefing the predictive model. When a developer is satisfied with the accuracy and robustness of the predictive model, the predictive model can be applied to a new dataset for predictive insights.

Predictive capabilities are widespread in an enterprise resource planning (ERP) and can be used to help refine the resource planning based on prediction outcomes. Because machine learning is an approximate modeling (e.g., probabilistic and statistical), a predictive algorithm is often associated with debrief information enabling a user to assess the model's accuracy (of prediction) and to provide insights for interpretability (e.g., variable importance explaining a target to predict). At present, many different predictive algorithms are available to resolve a particular machine learning task (classification, regression, time series, clustering, etc.) Similarly, there are many ways to debrief the predictive algorithm (e.g., area under curve, variable contributions, key performance indicators, confusion matrix, etc.) Typically, the process of selecting debriefing components is performed by a user when building a complex data flow, which is referred to herein as a machine learning model pipeline ("model pipeline"). In addition, the user must also specify how such debriefing components are obtained by establishing processing within the model pipeline.

The example embodiments overcome the drawbacks of having a user select debriefing components and establishing processing for the debriefing components by providing a framework which automates the selection of debriefing components and further auto-completes a machine learning model pipeline by adding processing for generating the debriefing outputs. While a user is building a machine learning model pipeline via a user interface, the framework may detect a selection of a predictive algorithm to be included in the machine learning model. In response, the framework may identify debriefing components for the predictive algorithm, and automatically incorporate processing for generating outputs for the debriefing components in a background and without requiring a user to generate such processing. The framework includes a catalog where debrief components are declared, and where processing agents are identified for preparing outputs for the debriefing components.

A predictive application based on the framework may include a catalog of operations that can be integrated within the model pipeline through a user interface. Through the application a user may build a machine learning procedure as a data flow pipeline. Items may be added to the model pipeline via drag-and-drop, etc. An item may be shaped as a node taking input ports (for incoming data flows), output ports, and its specific parameters. Predictive algorithms may be added to the model pipeline as nodes. The algorithms may be annotated with conditional debrief output port declarations to specify the relevant debrief items which are applicable to itself in regards with its purpose, capacity and configuration. For example, a Random Forest algorithm may be declared with four extra output ports for debrief purposes including KPIs, ROC curves, variable importance, and univariate statistics.

The predictive algorithms have declarations stored in metadata of a catalog that identifies debrief components per algorithm type. A pipeline compiler component may determine, in a generic fashion and based on the request/process declarative annotations, the most appropriate debrief processor nodes to handle the debrief item evaluation delegated by the predictive algorithm to complete the model pipeline with operations to provide such debrief items. Several processor nodes (or agents) can be enrolled and combined (union operation) to address a particular debrief request types.

Figure 1:
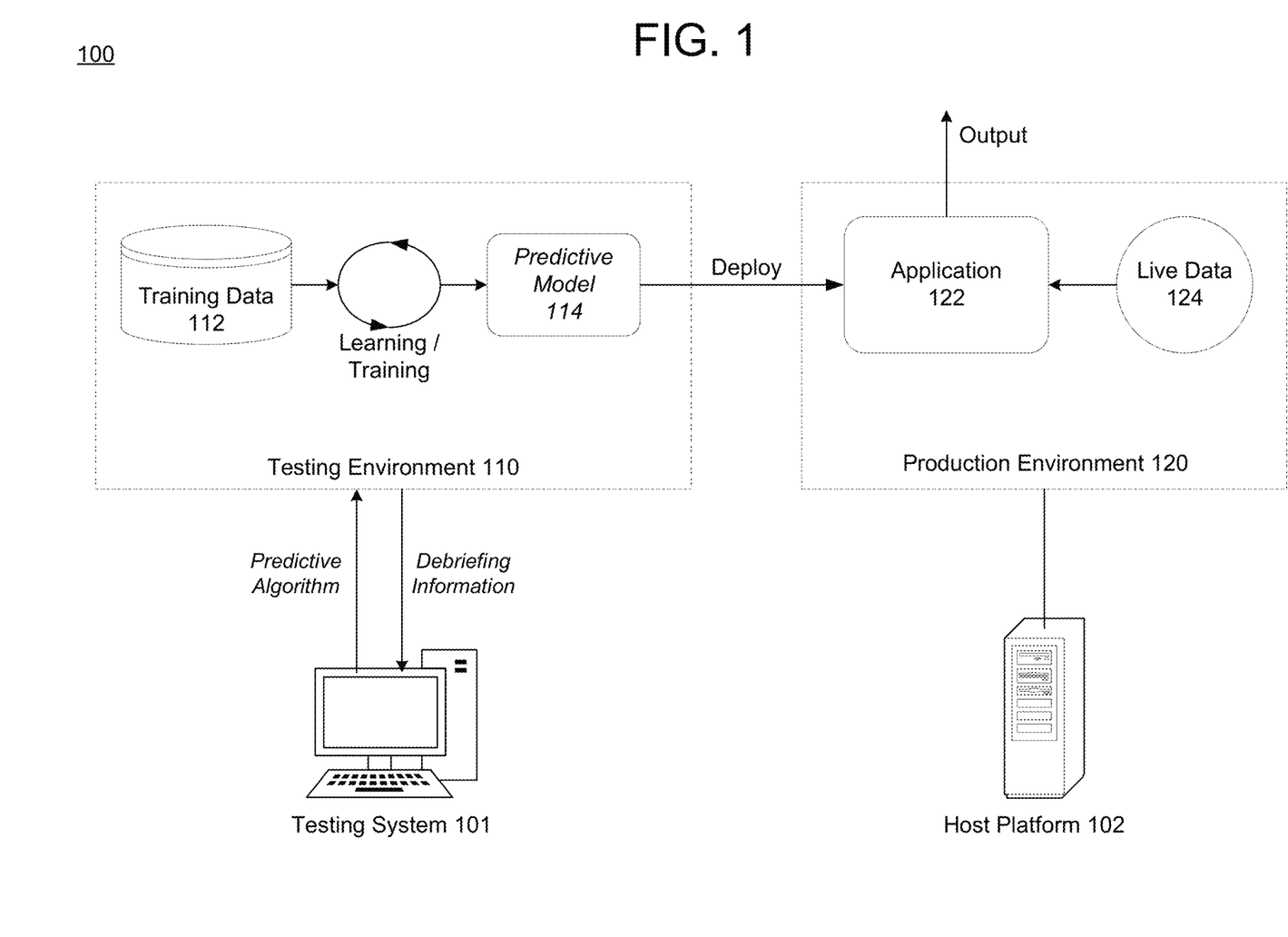
FIG. 1 is a diagram illustrating a computing environment for deploying a predictive model in accordance with an example embodiment.

FIG. 1 illustrates a computing environment 100 for deploying a predictive model in accordance with an example embodiment. Referring to FIG. 1, the environment 100 may include multiple executing environments such as a testing environment 110 (also referred to as a development environment) and a production environment 120 (also referred to as a live environment). In this example, the testing environment 110 is operated by a testing system 101 and the production environment 120 is operated by a host platform 102. For example, the testing system 101 may be a user device interacting with a model while it is being trained while the host platform 102 may be a server, a cloud platform, a database, a combination of devices, and the like, where the model is deployed after successful training. Although not shown in FIG. 1, in some cases, the testing environment 110 and the production environment 120 may be operated by the same computing system or they may be operated by different devices or groups of devices.

Within the testing environment 110, users such as a data scientist may build (train) the predictive model 114 based on historical training data 112. The users may look for bugs, design defects, and the like, while evaluating a performance of the predictive model 114 through an iterative process. The user, via the testing system 101, may design a machine learning model pipeline and provide a predictive algorithm for use with the machine learning model. In response, the testing environment 110 may train the model based on input training data and generate debriefing information for view by the testing system 101. Meanwhile, the production environment 120 is where the model 114 may be deployed and put into operation for its intended use. For example, the predictive model 114 may be deployed from the testing environment 110 into the production environment 120 and integrated with application 122.

The testing environment 110 (where changes are made and tested) and the production environment 120 (live interaction with end users) are separated through several stages in between. This structured release management process allows for phased deployment (rollout), testing, and rollback in case of problems. The phased deployment may include various stages which may include an initial hypothesis stage where a hypothesis is proposed, a load and transform data stage where data relevant to the hypothesis is collected and converted to fit a framework, a feature identification stage where data scientists can tailor a model before building it, a model building stage where one or more predictive algorithms may be selected based on various factors (data, use case, available computational resources, etc.) and used to created predictive model 114, an evaluation stage where the predictive model 114 is evaluated with test data, and a deployment stage where the fully trained predictive model 114 is launched or otherwise deployed into the live production environment 120 where it can generate and output predictions based on live data 124.

Figure 2A:
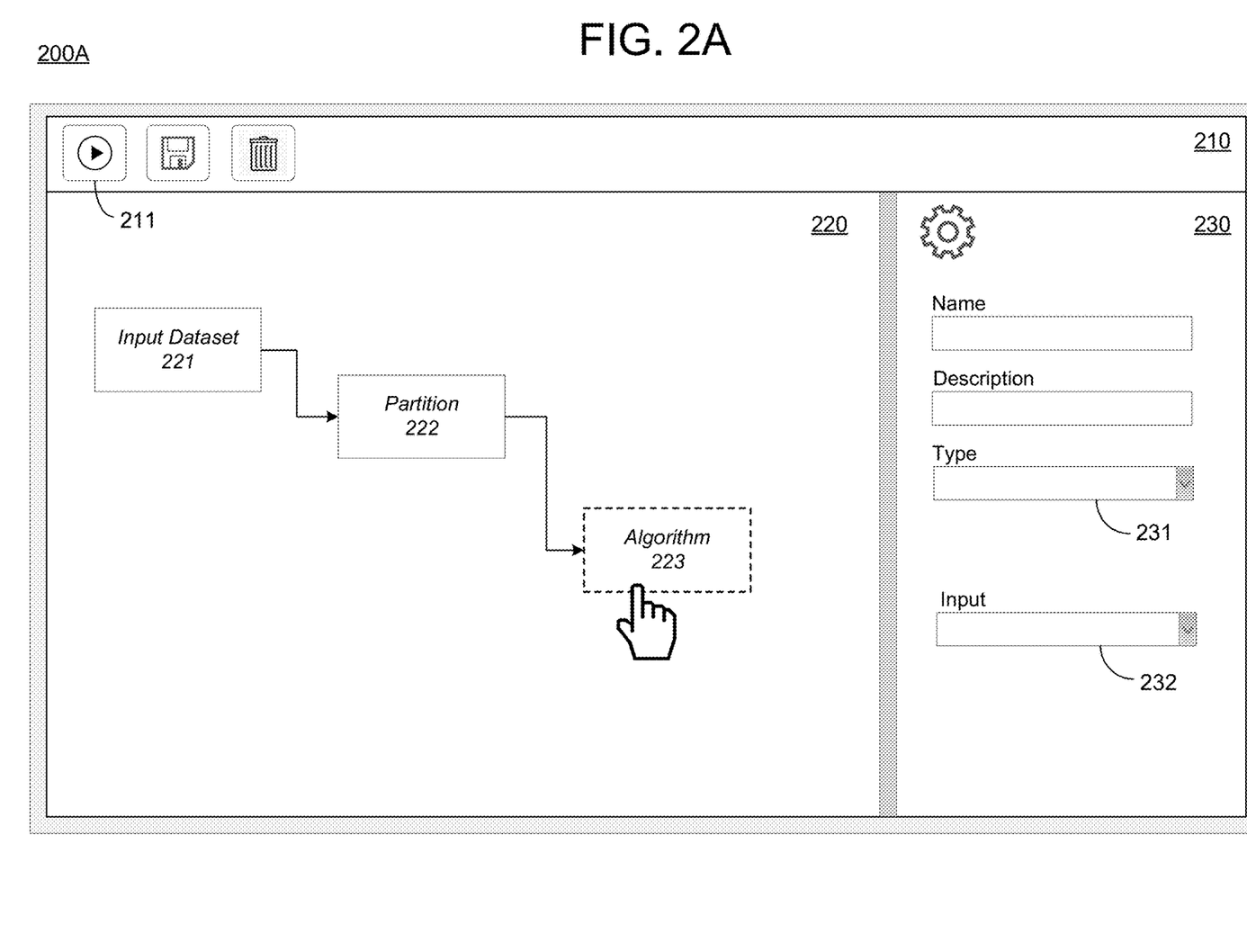
FIGS. 2A-2C are diagrams illustrating a user interface for building a machine learning model pipeline and receiving auto-completed debriefing information in accordance with example embodiments.
Figure 2B:
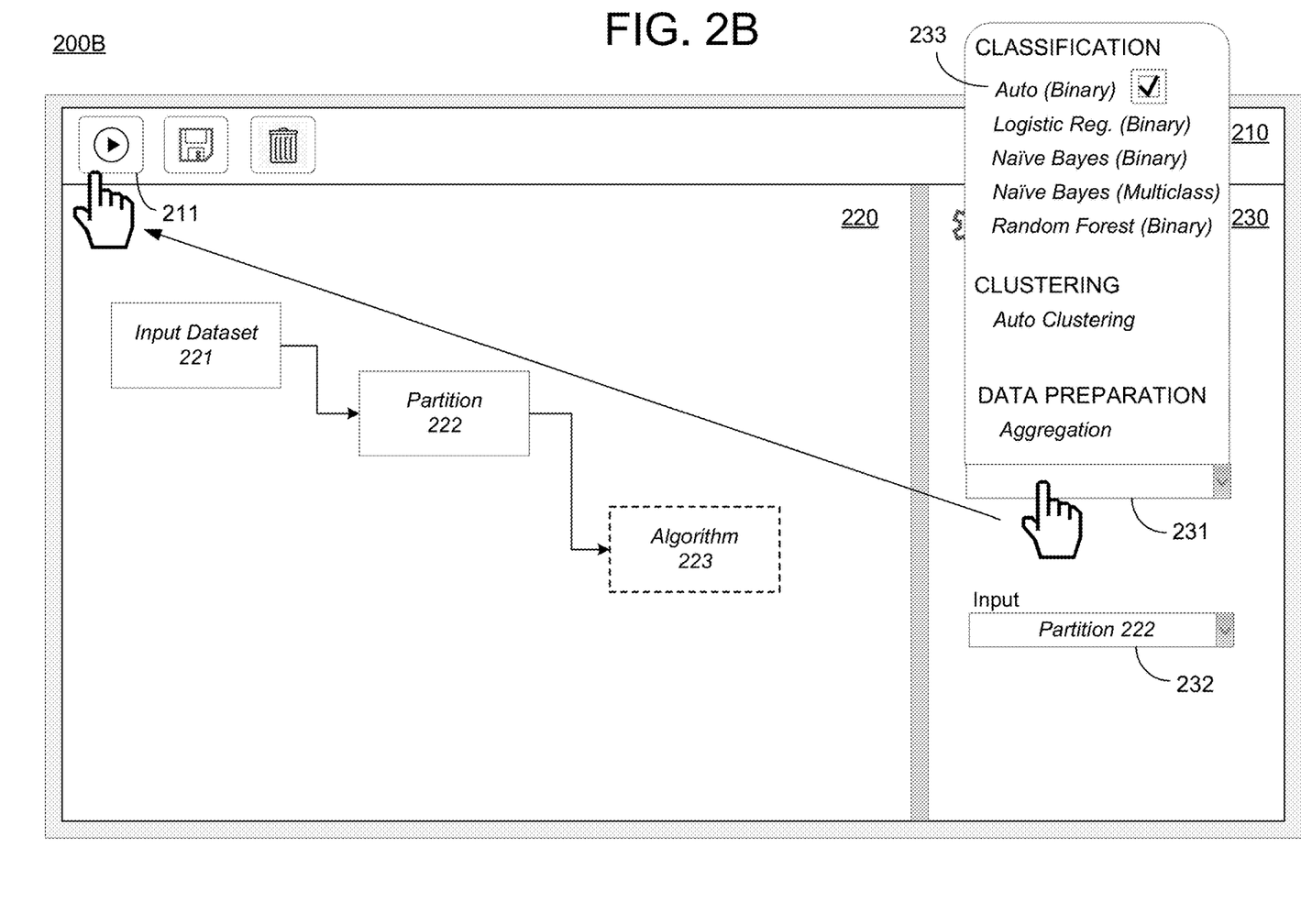

According to various embodiments, the testing system 101 may interact with the testing environment 110 via a user interface such as shown in the examples of FIGS. 2A-2B. The user may designate various nodes for a machine learning model pipeline. In response to selecting a predictive algorithm for use within the model pipeline, a framework that is implemented via the testing environment 110 may identify debriefing components for the predictive algorithm from declarations within a catalog (metadata) of the framework. The testing environment 110 may also establish processing for creating outputs for the identified debriefing components. The identification of the debriefing components and the establishment of the processing can be performed in a background of the user interface such that neither is visible to the user of the testing system 101.

Figure 2C:
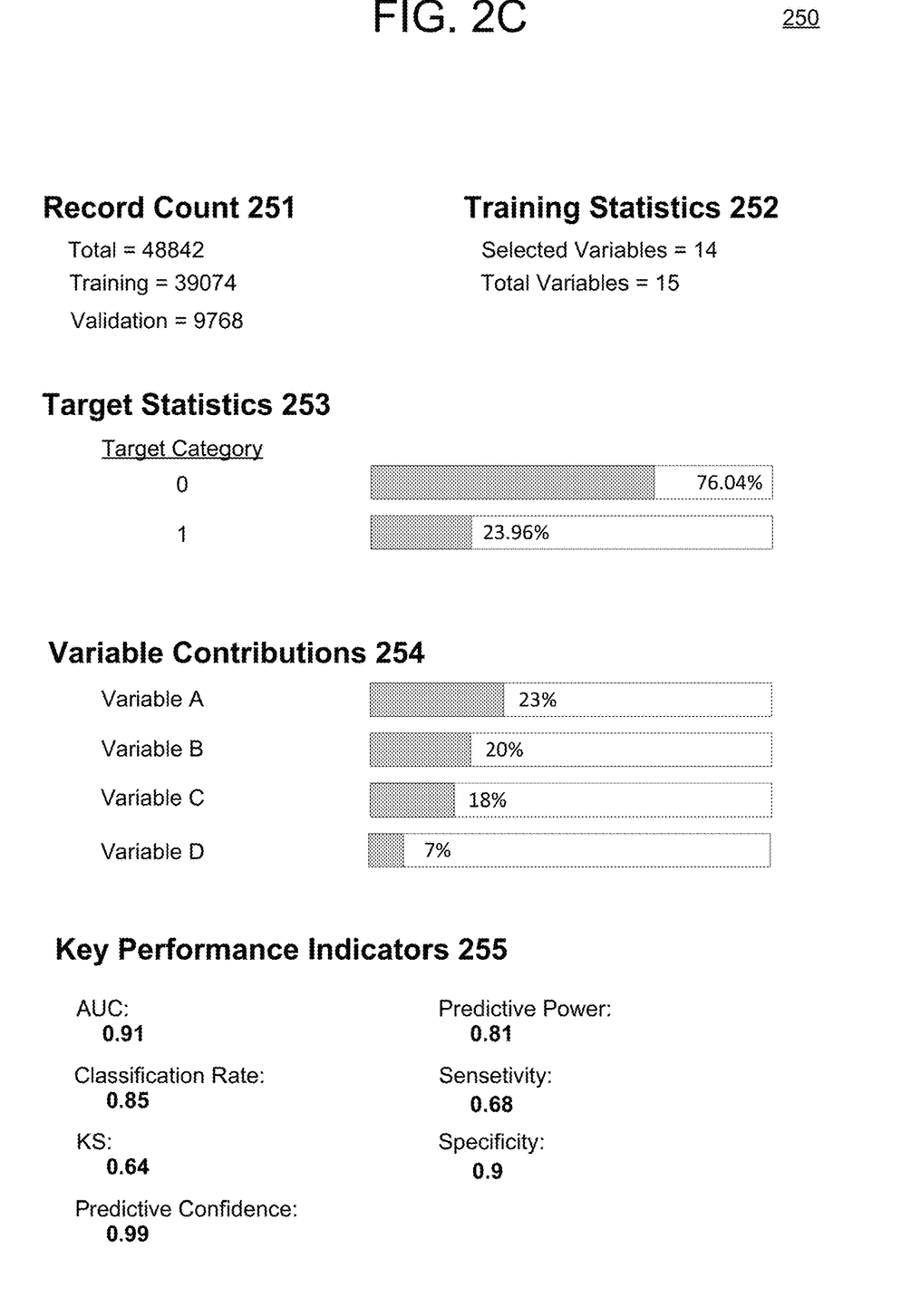

FIG. 2A-2C illustrate examples of an application built on the framework described herein which can be used to build a machine learning model pipeline. In the example of FIG. 2A, a user interface 200A is shown in which a user may select nodes (e.g., nodes 221, 222, 223, etc.) for inclusion in the model pipeline via a pipeline workspace 220. In this example, the user may use a menu to add or select new components to be added to the pipeline workspace 220. As another example, the user may right click within the workspace 220 or any other suitable means to add new nodes or delete nodes from the workspace 220. In this example, a user has begun building the model pipeline which includes an input dataset node 221, a partitioning node 222 for partitioning the input dataset into subsets, and a predictive algorithm node 223.

The user interface 200A also includes a control panel 210 with inputs for various features. In the example of FIG. 2A, the control panel 210 includes an execute button 211 for training the model as currently depicted in the machine learning model pipeline that is built within the pipeline workspace 220. Other commands may include saving, deleting, etc. The user interface 200A also includes a configuration menu 230 which allows the user to configure various attributes of a node. In this example, the menu 230 includes fields for naming a node, describing the node, and also drop down boxes 231 for inserting/selecting a predictive algorithm type, and 232 for designating an input dataset for the selected predictive algorithm.

FIG. 2B illustrates a subsequent state of the user interface 200B where a user has selected the predictive algorithm field 231 for inserting a type of predictive algorithm associated with the algorithm node 223. In this example, the auto classification algorithm is selected from among a list of multiple types of machine learning algorithm types such as classification, regression, clustering, time-series, data preparation, and the like. The user has also set the partition 222 node as the input for the algorithm 223. According to various embodiments, upon selection of the auto classification option 233, the framework may automatically identify debriefing components for the predictive algorithm node 223 based on a type of the predictive algorithm selected from the list in the field 231. Furthermore, although not shown, the framework may establish processing for generating the outputs of the debriefing components based on the model pipeline shown within the workspace 220.

Furthermore, the user may execute the model pipeline including the input dataset 221, the partitioning node 222, and the algorithm 223, in response to the execute button 211 being selected via the user interface 200B. In response, debriefing information may be generated and output based on the training, as shown in the example of FIG. 2C. In particular, FIG. 2C illustrates an example of a debriefing report 250 which includes information about the classification algorithm 223 executing based on the training data from partition 222. In this example, the debriefing information includes record information 251, variable statistics 252, target statistics 253, variable contributions for identifying the target 254, and key performance indicators 255. It should be appreciated that the debriefing information shown in FIG. 2C is one example of the types of debriefing information that can be shown for one type of predictive algorithm (classification). It should be appreciated that different types of debriefing information may be generated for different types of algorithms, and different types of debriefing information may be generated for classification algorithms.

Building a machine learning model pipeline is very common in AI field but it's a tricky task for non data scientist profile. In particular, once the user selects a predictive algorithm, he usually has some hard time to find out all the relevant KPI, performance curves, univariate statistics or insights provided specifically by the algorithm (e.g., variable importance). Indeed, the debrief information described above is task purpose/algorithm/implementation dependent and in short, its relevancy conditions may be quite complex (e.g., AUC is only applicable for binary classification, not multiclass, AUC is computable if the predictive node produces a score value or a decision probability, etc.)

Once the conditional debrief request/process metadata has been declared within the predictive catalog, it's possible to extend gracefully and automatically the pipeline definition to incorporate all technical process nodes to perform debrief item evaluations. The business user can capture upfront static debrief item availability for each predictive node. In some cases, the predictive algorithm node may be declared as a "super node" embedding additionally the debrief item production (even if at runtime, the effective debrief item evaluation is delegated to an external processor node). This auto-completion for debriefing facilitates pipeline construction by hiding the complexity of the conjunction between the predictive output nature (score, probability, decision, time series forecast, clustering index, etc.) and its relevant debrief information whose constraints may be driven by complex predicates. It nicely participates to the democratization of ML to address non-expert population by automating the technical configuration to get all significant indicators (debrief information).

Figure 3A:
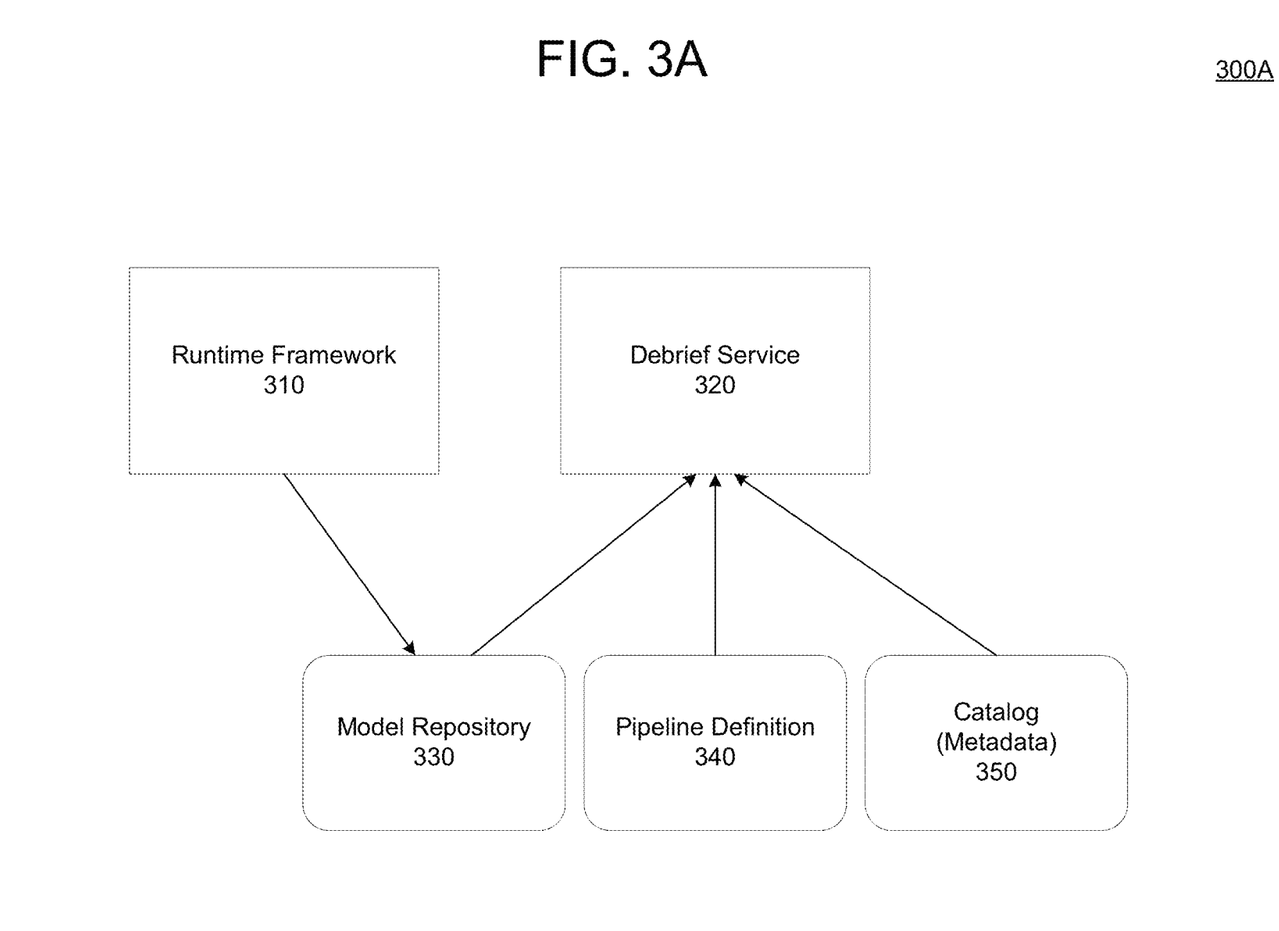
FIG. 3A is a diagram illustrating a debrief processing framework in accordance with an example embodiment.
Figure 3B:
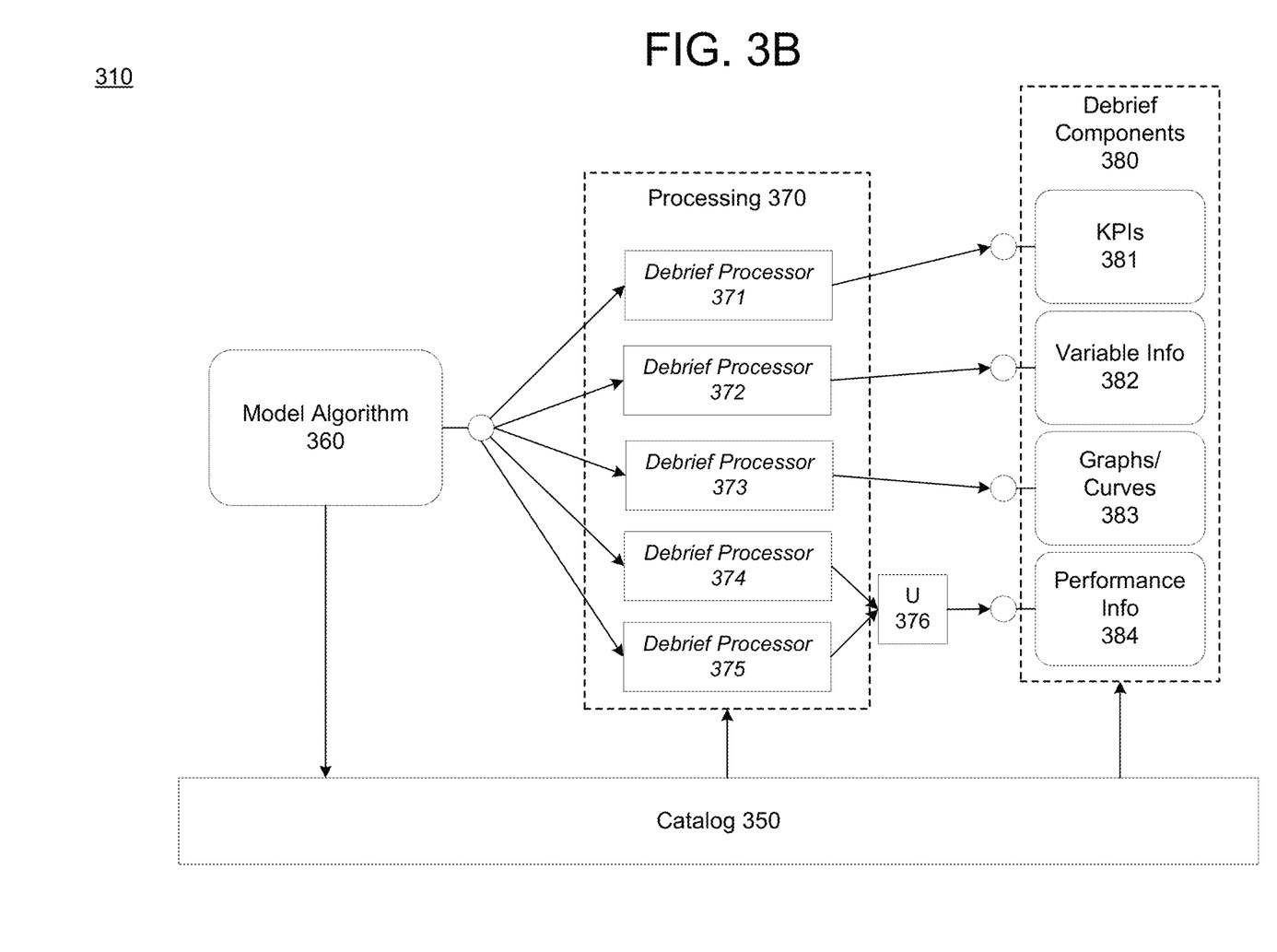
FIG. 3B is a diagram illustrating a debrief processing runtime in accordance with an example embodiment.

FIG. 3A illustrates a debrief processing framework 300 ("framework 300") in accordance with an example embodiment, and FIG. 3B further illustrates a debrief processing runtime 310 "runtime 310" which is part of the framework 300, in accordance with an example embodiment. Referring to the example of FIG. 3A, the framework 300 includes the runtime 310, a debrief service 320, a model repository 330, a pipeline definition 340, and a catalog 350. The runtime 310 is responsible for collecting, evaluating and persisting the debrief parts of all modeling pipeline nodes at training time. Such debrief parts may be persisted into the model repository 330 as a companion of the train model serialization and may be consumed by the debrief service 320 which queries and builds the reports to be examined by the end user. The pipeline definition 340 may be acquired from the user interface where the user is building the model pipeline. Furthermore, the catalog 350 may store declarations within metadata that identifies which debrief components are associated with each predictive algorithm, as well as processing for the debrief components.

In this example, the debrief service 320 may consolidate the information coming from the model repository 330, the pipeline definition 340 and the catalog 350. At execution time, the framework 310 may populate the model repository 330 with information on the learning outcomes (modeling procedure description and the performance) of the model being trained, and the metadata related to the task definition may be extracted from other sources than the model repository 330 (modeling node parameters, etc.) In some embodiments, a minimum of amount of information may be persisted into the model repository 330 to avoid redundancy. In some embodiments, derived information (from raw persistent data) may be evaluated on the fly when building the debrief reports. Furthermore, highly intensive accessed and/or greedy evaluation may be cached at training time.

Standard debriefing information and algorithm specific ones are considered separately. For example, the standard debriefing may be stored into a common/structured schema imposed by the runtime framework 310, regardless of how they are evaluated. This enables the system to normalize when possible the debrief schema to make them comparable across different algorithms for readability sake and for pipeline expressiveness. In some embodiments, specific debriefing components may be stored with its own schema and non structured data is allowed (PMML, etc.) The catalog 350 has dedicated output port descriptors with table schema and extra debrief annotations to help building the report.

The schema is applicable for all runtimes supporting tabular schema. The schema may be flexible and evolving enough to capture standard debrief (which can be extended gradually) and custom debrief (per node). The schema may support structured and non structured data (e.g., curve images produced by R node). The schema may be simple and portable across different storage systems (e.g., tabular and stream types are the minimum requirements, no strong assumption on the support of lock, foreign key, integrity constraint, concepts, etc.). The scheme may be easy to query with reasonable response time (no complex SQL statement to extract the raw information with a ton of join paths) and may be concurrent friendly and roughly lock free.

The debrief model is by nature a composite with different possible debrief components which may include, but are not limited to, a data summary per dataset (training, validation, test), number of rows information on variable/feature counts, modeling task configuration including algorithm name and principal parameters, key performance indicators (KPI) per dataset KI, KR, L1, L2, where a confusion matrix may be built from scalar indicators (sensitivity, precision, . . . ). Other debrief components include charts (ROC/Lift/Lorenz charts, etc.) possibly per variable (univariate response curve), descriptive statistics on target or predictors (for continuous variable: mean, min, max, . . . ), a data preview on prediction output, a variable contribution for identifying the target from among variables within the predictive algorithm, and the like.

The debrief components provide insight that helps to better qualify the resulting predictive model and the data structure from which the algorithm learns. Some of the debrief components are defined per partition (KPI, gain/profit chart, descriptive stats, etc.) The modeling debrief components may be contextual and depend on the involved algorithm. As mentioned previously, standard debrief information may be determined by the modeling task nature (binary classification, multi-class classification, regression, time series forecast, clustering, recommendation, etc.) The standard debrief information can be computed by a shared and dedicated module to guarantee a common way to evaluate performance metrics such as a confusion matrix KPI that can be evaluated for all binary classifiers regardless of the underneath techniques (SVM, Logistic regression, etc.) Meanwhile, per algorithm/node specific debrief information may include custom debrief components such as custom curves, variable contributions, and the like. The debrief model may be multi-granular and its parts may be defined per pipeline (execution time, number of nodes, etc.)

The runtime framework 310 may evaluate all debrief artifacts as part of a physical plan generation strategy that can contain all the necessary instructions to evaluate the debrief information from the flowing data and the final persistence into the model repository 330. The runtime framework 310 may orchestrate and handle the debrief processing in the generic way as far as possible. An example of the framework 310 orchestrating or controlling the debrief processing is shown in the example of FIG. 3B.

Referring to FIG. 3B, a user has selected a predictive algorithm 360 for inclusion within a model pipeline. The catalog 350 may store metadata which declares the types of debrief components 380 (e.g., components 381, 382, and 384) that are associated with a type of the predictive algorithm from among a plurality of types (classification, regression, clustering, time-series, etc.) as well as among a plurality of sub-types within an algorithm type. In some embodiments, the metadata within the catalog 350 may include dedicated annotations to have a meta-driven debrief processing. Such extensions may handle both standard and custom debrief information. As the standard debrief information may be relevant per algorithm family regardless of its concrete technique or implementation (APL vs PAL, SVM vs automated classifier, etc.), the framework 310 may share common debrief definitions per algorithm family by providing intermediate interfaces from which the concrete predictive nodes are to derive debrief information.

In this example, the runtime 310 identifies processing 370 for the debrief components 380 which in this example includes a plurality of dedicated debrief processing nodes 371, 372, 373, 374, and 375, for processing information from the training of the predictive algorithm 360 to generate the respective debrief components 381, 382, 383, and 384. The catalog 350 may identify nodes for processing debrief information (i.e., debrief processing nodes 371-375) as well as the types of debrief components 381-384 that each node can process. In some examples, the debrief processing nodes may individually process a generic (standard) debrief component such as debrief components 381-383, in the example of FIG. 3B. However, when a specific debrief component is needed, multiple debrief processors (debrief processors 374 and 375) may create a union 376 to generate the specific debrief component 384.

In some embodiments, the processing nodes 371-375 may play two roles. For example, a node may be a debrief requestor in which the node describes or declares explicitly with annotations the set of debrief types which are applicable for the node. As another example, the node may be a debrief processor, this special node describes exhaustively with annotations the set of debrief types it can compute and the list of input requirements (score values, target values, etc.). In some cases, a node can partly play both roles. For instance, the custom debrief production is on the head of the predictive node but it delegates the standard debrief to another node. For a modularity sake, the system may decouple the task to learn and predict from the task of evaluating its performance or getting statistics on the dataset.

The catalog 350 may include node descriptors that provide all the necessary information to determine per pipeline node the debrief requests. A compiler may access all debrief processor node descriptors with their respective capacities, and the runtime framework 310 can complement the logical plan by injecting the appropriate processing nodes in respect to their declared capacities. The principle to handle the evaluation and persistence of all meaningful debrief parts is to enrich catalog metadata to define more precisely the modeling task nature and the prediction capacity (e.g., produce decision probability or score, binary classification, etc.) The categorization may be fine grained enough to determine eligible standard debrief parts. For example, one way would be defined intermediate interface with properties as follows. Debrief components are usually terminal and merely persisted into the model repository for later user examination but some of them (KPI, model configuration, etc.) can be consumed in the flow of the model pipeline. For such non terminal debrief components, they may be shaped as an official output port in the catalog 350.

In some embodiments, one interface may be defined per debrief component type. Also, a concrete node class can implement several debrief interfaces. At logical plan generation, depending on the nature of the modeling node and its prediction capacity, the runtime 310 may append missing output ports specifying formally the debrief component evaluation requests, at physical plan generation, the runtime 310 may match debrief requests held by the output ports to the proper debrief providers which are registered with their respective capacity model. The physical plan generator may compile the single logical node into a subgraph of physical nodes. For example, once the physical node has been decomposed into "pure" modeling node and debrief nodes, the runtime 310 may identify all debrief tagged output ports and inject the necessary scripts to persist them into physical table. If two providers complement each other in order to feed the same debrief component type (e.g., Provider1 (L1,L2) and Provider2 (R^2,KI)), the runtime 310 may concatenate instead of overriding.

In some embodiments, the modeling algorithms may be declared within the catalog 350 (metadata) in a hierarchical fashion to group together implementations/algorithms which solve the same functional modeling task. In this example, the functional modeling task is the nature of the business problem to be solved, for example, a classification (predict a categorical target), a regression (predict a continuous target), a clustering (group observations based on characteristics similarity), and the like. An example of a hierarchical catalog structure is provided below:

Binary Classification (2 distinct values for the target)
  Random Forest (algorithm)
  Logistic Regression
  SVM
  Naïve Bayes
Multinomial Classification (>2 distinct values for the target)
  Gradient Boosting
  Naïve Bayes
Clustering
  K-Means
  DBSCan
Regression
  Gradient Boosting
  Generalized Linear Model Per modeling task/algorithm family, multiple different algorithms may exist which can be used to provide a prediction. For example, a same algorithm can be placed under several groups as it's versatile (e.g., it can be used for regression and binary classification, etc.) The debriefing requests may be declared within the catalog 350 at two possible levels. In particular, debriefing requests may be declared at the functional modeling task level (which is the general classification including multiple algorithms underneath) or it can be declared at the algorithm level which is lower in the hierarchy than the functional model task level. At the functional modeling task level (e.g., a group of algorithms) such declared debrief items are admitted to be standard and can be computed by a common/standard debrief processor (agent). In addition, these debrief requests are consequently applicable to all algorithms under this group. Meanwhile, when declared at the algorithm level, debrief items are specific to this algorithm and are rarely applicable to other algorithms, and in some cases, not applicable to other algorithms at all. A hierarchical grouping is shown below:

Group 1 (d1, d2)
Group 2 (d3)
  Algorithm 1 (d4)

In this example, d1, d2, and d3 represent standard debrief item requests (such as KPIs, performance curves, LogLoss, etc.) while d4 is specific to algorithm 1. In addition, algorithm 1 also inherits debriefing items from its ancestors (group) and therefore includes their respective debrief requests. In this example, algorithm 1 will request to compute (d1, d2, d3, and d4) for a debriefing report. Organizing the algorithms/implementations into groups where the debriefing requests are declared includes multiple benefits. For example, the hierarchical grouping ensures that the debrief information produced is consistent across the plurality of implementations, and it makes the integration of a new algorithm much more easy as this algorithm will leverage automatically all the debrief items defined at the group level.

In some embodiments, the debrief runtime framework 310 may retain a combination of debrief processors which minimizes the overall cost to compute the debrief information. For example, the cost model may consider the fixed costs to trigger a processor such as processing nodes 371-375, etc., and estimate the processing cost to compute each individual debrief item. For example, the catalog 350 may store the following debrief processor information:

Debrief Processor Catalog
  Processor1 (d1, d2)
  Processor2 (d1)
  Processor3 (d3, d4)
  Processor4 (d2)
Modeling Algorithm Catalog
  Algo1 (d1, d2, d3, d4)

Here, the selection of algorithm 1 triggers a request for debrief items d1, d2, d3, and d4, which may correspond to KPIs, curves, logs, etc. There are several possibilities to combine different arrangement of processors to compute the debrief items. The framework 310 may determine the optimum combination based on cost. In this example, the following combinations may be performed to compute d1, d2, d3, and d4:

Processor 1+Processor 3
Processor 2+Processor 3+Processor 4
Processor 1 (−d2)+Processor 3+Processor 4

In this case, the framework 310 may determine which of the above combinations is least computationally expensive and thus more optimal.

Figure 4:
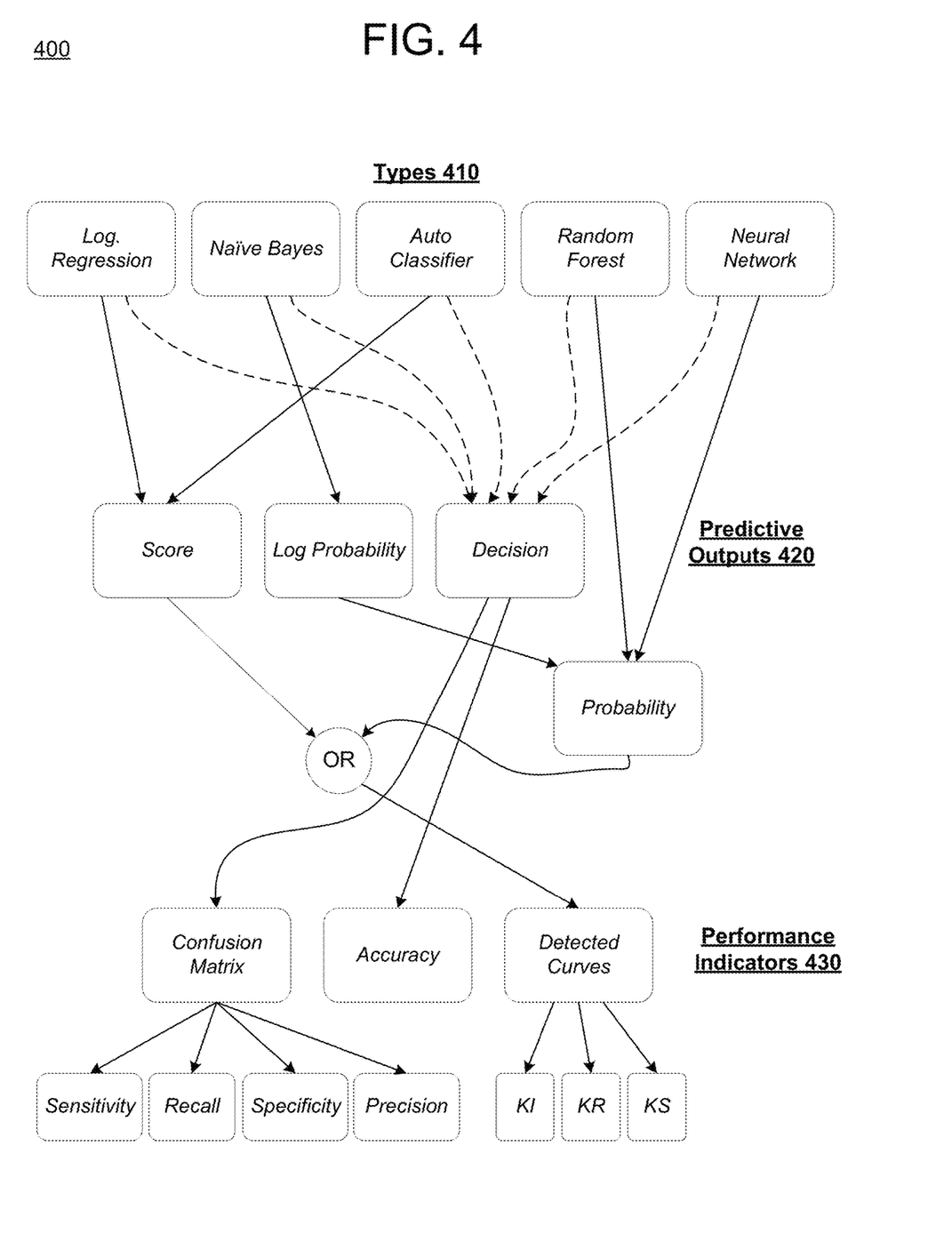
FIG. 4 is a diagram illustrating a mapping of algorithm types to debrief components in accordance with an example embodiment.

FIG. 4 illustrates a mapping 400 of algorithm types to debrief components in accordance with an example embodiment. The mapping 400 in FIG. 4 is for one type of predictive algorithm (classification). It should be appreciated that different mappings may be performed. Also, it should be appreciated that each predictive algorithm type (regression, clustering, time-series, etc.) may have different mappings. The mapping 400 may be identified from the catalog 350 metadata. The mapping includes classification types 410, types of predictive outputs 420, and performance indicators 430. In this example, the classification type algorithms 410 are mapped to types of predictive outputs 420 which are further associated with various performance indicators 430.

Figure 5:
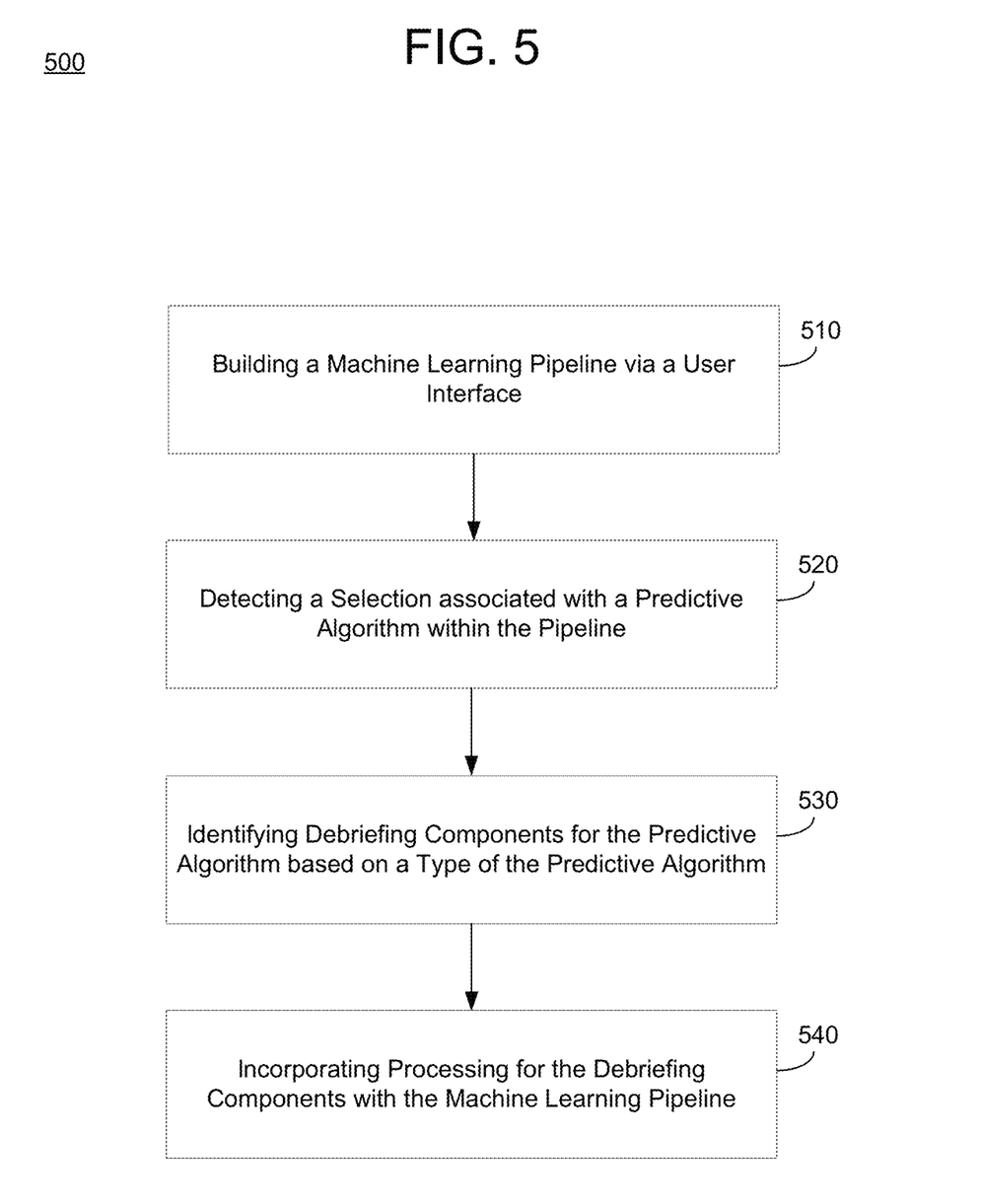
FIG. 5 is a diagram illustrating a method for auto-completing debrief processing for a model pipeline in accordance with an example embodiment.

FIG. 5 illustrates a method 500 for auto-completing debrief processing for a model pipeline in accordance with an example embodiment. As an example, the method 500 may be performed by a database node included within a distributed database system. As another example, the method 500 may be performed by a computing device such as a web server, a cloud platform, a personal computer, a user device, and the like. In some examples, the method 500 may be performed by a plurality of devices in combination. Referring to FIG. 5, in 510, the method may include building the model pipeline via a user interface. For example, inputs may be received via the user interface to generate a data flow of nodes representing events and data of a machine learning model. In some cases, the user interface may provide selectable options through drop-down boxes, drag-and-drop operations, and the like, which may be used to add and configure nodes within the model pipeline. The nodes may be connected via links to form a pipeline which represents a machine learning model.

In 520, the method may include detecting, via the user interface, a selection associated with a predictive algorithm included within the model pipeline. The predictive algorithm may be a regression type algorithm, a classification type algorithm, and a clustering type algorithm, a time-series algorithm, and the like. Within each type may be different sub-types. For example, a classification algorithm may be further broken up into a naïve Bayes algorithm, a random forest algorithm, an auto classifier, and the like.

In response to detecting the selection, in 530 the method may include identifying debriefing components for the predictive algorithm based on a type of the predictive algorithm from among a plurality of types of predictive algorithms. Here, the debriefing information may automatically be identified by the framework without requiring a user to input any information about the debriefing information. In other words, the framework may automatically identify which debriefing information is to be generated for a selected predictive algorithm type. Each algorithm type may be associated with different debriefing components. For example, a clustering-type algorithm may include clustering-based debriefing components such as cluster information. Meanwhile, a classification type algorithm may include variable contributions to target identification, KPIs, graphs, curves, sensitivity, specificity, and the like. According to various embodiments, the debriefing components may be dynamically identified based on declarations within metadata associated with the predictive algorithm. The identification may be performed in a background of the user interface and may be transparent to the user.

In 540, the method may include automatically incorporating processing for the identified debriefing components within the model pipeline such that values of the debriefing components are generated during training of the predictive algorithm within the model pipeline. The processing may include processing agents which are identified based on metadata within a catalog of the framework. Each algorithm type may have its own respective metadata and declarative debriefing information. In some embodiments, the automatically incorporating may include delegating processing nodes for generating the debriefing components during execution of the model pipeline. In some embodiments, the method may further include generating values for the debriefing components based on a training data set and the predictive algorithm within the model pipeline in response to an execution request being received via the user interface, and outputting a display of the values of the debriefing components via the user interface. The debriefing components may be illustrated via a report which can be accessed via the user interface.

Figure 6:
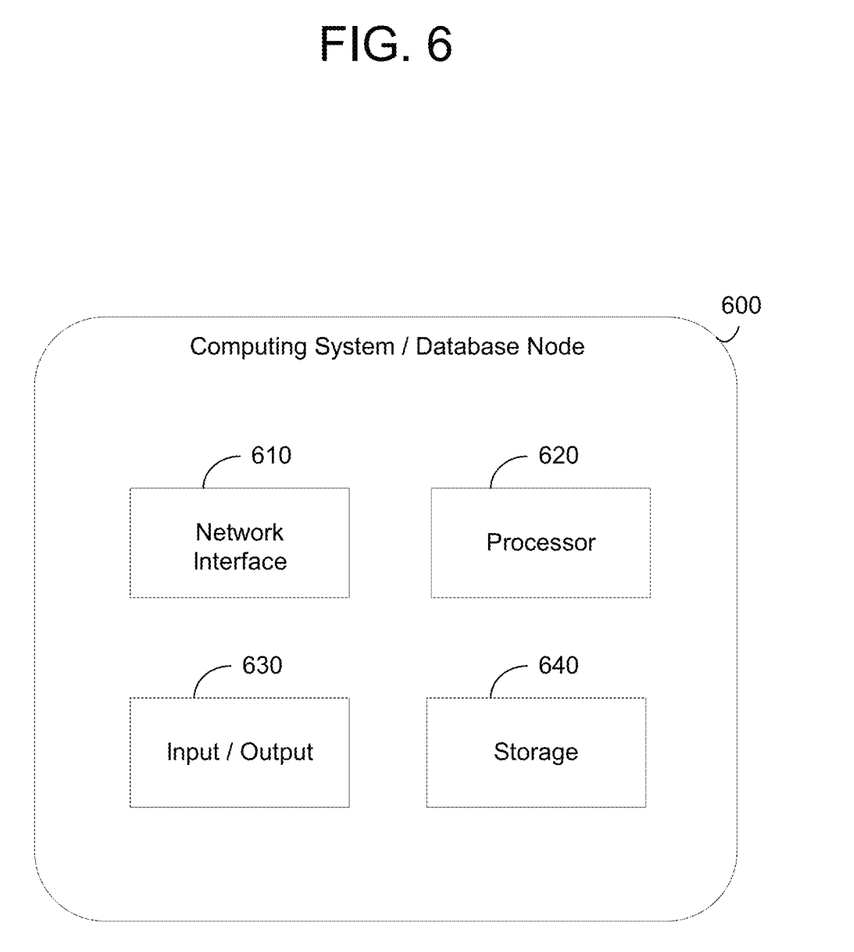
FIG. 6 is a diagram illustrating a computing system for use in the example embodiments described herein.

FIG. 6 illustrates a computing system 600 in accordance with an example embodiment. For example, the computing system 600 may be a database node, a web server, a cloud platform, a user device, or the like. In some embodiments, the computing system 600 may be distributed across multiple devices. Referring to FIG. 6, the computing system 600 includes a network interface 610, a processor 620, an input/output unit 630, and a storage device 640 such as an in-memory storage (e.g., RAM, etc.) Although not shown in FIG. 6, the computing system 600 may also include or be electronically connected to other components such as a display, an input unit, a receiver, a transmitter, a persistent disk, and the like. In some embodiments, the processor 620 may control or replace the other components (e.g., network interface 610, input/output 630, storage 640, etc.) of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable.

The input/output 630 may include ports for receiving data therein and for outputting data to an external device such as an embedded display of the computing system 600, an externally connected display, a display connected to the cloud, another device, and the like. For example, the input/output 630 may include a port, an interface, a cable, a wire, a board, and/or the like, with input/output capabilities. The network interface 610, the input/output 630, or a combination thereof, may interact with applications executing on other devices. The storage device 640 is not limited to a particular storage device and may include any known memory device such as RAM, NRAM, ROM, hard disk, and the like, and may or may not be included within the cloud environment. The storage 640 may store software modules or other instructions which can be executed by the processor 620 to perform the method 500 shown in FIG. 5.

According to various embodiments, the storage 640 may store debriefing components which are to be used during training of a machine learning algorithm within a machine learning model pipeline. The processor 620 may build the machine learning model pipeline via a user interface, for example, based on inputs received for configuring the model pipeline. The processor 620 may detect, via the user interface, a selection associated with a predictive algorithm included within the model pipeline, in response to the selection. The selection may include the user inputting a command (e.g., ENTER, etc.), the user selecting an algorithm type from a drop-down box, the user selecting a radio button, or the like.

In response, the processor 620 may identify debriefing components for the predictive algorithm based on a type of the predictive algorithm from among a plurality of types of predictive algorithms. Here, different debriefing components may be associated with the different types of predictive algorithms. The processor 620 may identify the debriefing components from metadata where declarations are made about the debriefing components based on the algorithm type. The processor 620 may automatically incorporate processing for the debriefing components within the model pipeline such that values of the debriefing components are generated during training of the predictive algorithm within the model pipeline.

In some embodiments, the model pipeline may include a plurality of nodes linked together to form a data flow which includes a training data set node and a node for the predictive algorithm. Meanwhile, the debriefing processing may be incorporated within a background of the user interface where it is not transparent to the user. Therefore, a user is relieved from having to manually configure debriefing processing or even identify which debriefing components to use with the machine learning algorithm they have selected. In some embodiments, the different debriefing components among the stored debriefing components may be identified for each type of predictive algorithm from among the plurality of types of predictive algorithms based on declarative statements in metadata of the framework. For example, the debriefing components may include one or more of graphs, key performance indicators (KPIs), and variable information of the predictive algorithm with respect to a prediction performed by the predictive algorithm.

In some embodiments, the processor 620 may automatically delegate processing nodes for generating the debriefing components during execution of the model pipeline. In some embodiments, the processor 620 may generate values for the debriefing components based on a training data set and the predictive algorithm within the model pipeline in response to an execution request being received via the user interface, and output a display of the values of the debriefing components via the user interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a storage configured to store debriefing components and a catalog of a framework; and
    a processor configured to
        build, via a user interface of the framework, an execution pipeline for training a machine learning model based on commands that are input via the user interface,
        detect, via the user interface, a selection of a predictive algorithm included within the machine learning model, wherein the predictive algorithm is modeled as a node in the catalog of the framework and is annotated with a plurality of output port declarations on a plurality of different output ports thereof which identify a plurality of debriefing components,
        identify a type of the predictive algorithm from among a plurality of different types stored in the catalog of the framework,
        establish a plurality of processing nodes for processing the plurality of debriefing components via a plurality of paths within the execution pipeline and outputting the debriefing components to a user interface, wherein the processor establishes the plurality of processing nodes by matching the plurality of output port declarations annotated on the predictive algorithm in the catalog to debrief identifiers of the plurality of processing nodes in the catalog,
        distribute execution of the debriefing components to the plurality of processing nodes within a runtime environment of the execution pipeline,
        execute the machine learning model in the runtime environment and train the executing machine learning model based on input training data via the runtime environment,
        execute the plurality of processing nodes of the execution pipeline within the runtime environment, respectively, which query the executing machine learning model during training and extract debrief values, respectively, based on the matching; and
        display the debrief values via the user interface.

2. The computing system of claim 1, wherein the execution pipeline comprises a plurality of processing nodes linked together to form a data flow which includes a training data set node and a node for the predictive algorithm.

3. The computing system of claim 1, wherein different debriefing components are identified for each type of predictive algorithm from among a plurality of possible types of predictive algorithms stored in the catalog.

4. The computing system of claim 3, wherein the plurality of types of predictive algorithms include a regression type, a classification type, and a clustering type.

5. The computing system of claim 1, wherein the debriefing components include custom debriefing components that are dynamically identified from stored debriefing components based on declarations within catalog metadata associated with the predictive algorithm.

6. The computing system of claim 1, wherein, when executed, the debriefing components comprise one or more of graphs, key performance indicators (KPIs), and variable information of the predictive algorithm with respect to a prediction performed by the predictive algorithm.

7. The computing system of claim 1, wherein the processor is further configured to identify the debriefing components based on a hierarchical relationship between declared algorithm groups included in the catalog.

8. The computing system of claim 1, wherein the processor is configured to distribute execution of a debriefing component to at least two processing nodes of the runtime environment, and generate a debrief value for the debriefing component based on a union operation applied to at least two outputs from the at least two processing nodes.

9. A method comprising:
storing debriefing components and a catalog of a framework;
building, via a user interface of the framework, an execution pipeline for training a machine learning model based on commands that are input via the user interface;
detecting, via the user interface, a selection of a predictive algorithm included within the machine learning model, wherein the predictive algorithm is modeled as a node in the catalog of the framework and is annotated with a plurality of output port declarations on a plurality of different output ports thereof which identify a plurality of debriefing components;
identifying a type of the predictive algorithm from among a plurality of different types stored in the catalog of the framework;
establishing a plurality of processing nodes for processing the plurality of debriefing components via a plurality of paths within the execution pipeline and outputting the debriefing components to a user interface, wherein the establishing comprises matching the plurality of output port declarations annotated on the predictive algorithm in the catalog to debrief identifiers of the plurality of processing nodes in the catalog;
distributing execution of the debriefing components to the plurality of processing nodes within a runtime environment of the execution pipeline;
executing the machine learning model in the runtime environment and training the executing machine learning model based on input training data via the runtime environment;
executing the plurality of processing nodes of the execution pipeline within the runtime environment, respectively, which query the executing machine learning model during training and extracting debrief, respectively, based on the matching; and
displaying the debrief values via the user interface.

10. The method of claim 9, wherein the execution pipeline comprises a plurality of processing nodes linked together to form a data flow which includes a training data set node and a node for the predictive algorithm.

11. The method of claim 9, wherein different debriefing components are identified for each type of predictive algorithm from among a plurality of possible types of predictive algorithms stored in the catalog.

12. The method of claim 11, wherein the plurality of types of predictive algorithms include a regression type, a classification type, and a clustering type.

13. The method of claim 9, wherein the debriefing components include custom debriefing components that are dynamically identified from stored debriefing components based on declarations within catalog metadata associated with the predictive algorithm.

14. The method of claim 9, wherein, when executed, the debriefing components comprise one or more of graphs, key performance indicators (KPIs), and variable information of the predictive algorithm with respect to a prediction performed by the predictive algorithm.

15. The method of claim 9, wherein the identifying the custom debriefing components comprises identifying the debriefing components based on a hierarchical relationship between declared algorithm groups included in the catalog.

16. A non-transitory computer readable medium storing program instructions which when executed are configured to cause a computer to perform a method comprising:
storing debriefing components and a catalog of a framework;
building, via a user interface of the framework, an execution pipeline for training a machine learning model based on commands that are input via the user interface;
detecting, via the user interface, a selection of a predictive algorithm included within the machine learning model, wherein the predictive algorithm is modeled as a node in the catalog of the framework and is annotated with a plurality of output port declarations on a plurality of different output ports thereof which identify a plurality of debriefing components;
identifying a type of the predictive algorithm from among a plurality of different types stored in the catalog of the framework;
establishing a plurality of processing nodes for processing the plurality of debriefing components via a plurality of paths within the execution pipeline and outputting the debriefing components to a user interface, wherein the establishing comprises matching the plurality of output port declarations annotated on the predictive algorithm in the catalog to debrief identifiers of the plurality of processing nodes in the catalog;
distributing execution of the debriefing components to the plurality of processing nodes within a runtime environment of the execution pipeline;
executing the machine learning model in the runtime environment and training the executing machine learning model based on input training data via the runtime environment;
executing the plurality of processing nodes of the execution pipeline within the runtime environment, respectively, which query the executing machine learning model during training and extracting debrief values, respectively; and
displaying the standard debrief values and the custom debrief values via the user interface.

17. The non-transitory computer readable medium of claim 16, wherein the execution pipeline comprises a plurality of processing nodes linked together to form a data flow which includes a training data set node and a node for the predictive algorithm.

18. The non-transitory computer readable medium of claim 16, wherein different debriefing components are identified for each type of predictive algorithm from among a plurality of types of predictive algorithms stored in the catalog.

19. The non-transitory computer readable medium of claim 18, wherein the plurality of types of predictive algorithms include a regression type, a classification type, and a clustering type.

* * * * *